US012340084B2

(12) United States Patent
Martinez Lerin et al.

(10) Patent No.: US 12,340,084 B2
(45) Date of Patent: Jun. 24, 2025

(54) QUOTA MANAGEMENT SYSTEM AND QUOTA MANAGEMENT METHOD

(71) Applicant: Hitachi, Ltd., Tokyo (JP)

(72) Inventors: Pablo Martinez Lerin, Tokyo (JP); Mitsuo Hayasaka, Tokyo (JP)

(73) Assignee: Hitachi Vantara, Ltd., Yokohama (JP)

( * ) Notice: Subject to any disclaimer, the term of this patent is extended or adjusted under 35 U.S.C. 154(b) by 0 days.

(21) Appl. No.: 18/583,525

(22) Filed: Feb. 21, 2024

(65) Prior Publication Data

US 2024/0377947 A1 Nov. 14, 2024

(30) Foreign Application Priority Data

May 10, 2023 (JP) ................. 2023-077955

(51) Int. Cl.
*G06F 3/06* (2006.01)
(52) U.S. Cl.
CPC .......... *G06F 3/0607* (2013.01); *G06F 3/0631* (2013.01); *G06F 3/067* (2013.01)

(58) Field of Classification Search
CPC .... G06F 3/0607; G06F 3/0631; G06F 3/0653; G06F 3/067
See application file for complete search history.

(56) References Cited

U.S. PATENT DOCUMENTS 11,003,497 B2 5/2021 Xiao et al.

*Primary Examiner* — Yong J Choe
(74) *Attorney, Agent, or Firm* — Procopio, Cory, Hargreaves & Savitch LLP

(57) ABSTRACT

A system receives a quota request in which a tenant, one or more locations, and a capacity upper limit related to a requested quota are designated, executes conflict determination n based on quota information, and adds information related to the requested quota to the quota information when a result of the conflict determination is false. The quota information includes information representing a tenant, one or more locations, and a capacity upper limit for each quota of the plurality of storage devices at the plurality of locations. For each of the plurality of locations, a capacity usable by the tenant among a capacity of the storage device at the location is equal to or less than the capacity upper limit of the quota corresponding to the location and the tenant.

15 Claims, 8 Drawing Sheets

TENANT TABLE
4310

| TENANT ID | TENANT NAME | PARENT TENANT ID |
|---|---|---|
| Tenant 1 | Company A | Top |
| Tenant 1.1 | Branch A | Tenant 1 |
| Tenant 1.2 | Branch B | Tenant 1 |
| Tenant 1.2.1 | Sales E | Tenant 1.2 |
| Tenant 1.2.2 | Sales W | Tenant 1.2 |
| Tenant 2 | Company B | Top |
| Tenant 2.1 | Team 1 | Tenant 2 |
| Tenant 2.2 | Team 2 | Tenant 2 |

LOCATION TABLE
4320

| LOCATION | STORAGE TYPE |
|---|---|
| US-West | SSD、HDD |
| UK | SSD、HDD |
| Japan | SSD |

QUOTA TABLE
4330

| QUOTA ID | TENANT ID | TENANT NAME | LOCATION | STORAGE TYPE | CAPACITY UPPER LIMIT | USED CAPACITY |
|---|---|---|---|---|---|---|
| Q1 | Tenant 1 | Company A | US-West, UK, Japan | SSD | 500TB | 2TB |
| Q2 | Tenant 1.2 | Branch B | UK, Japan | SSD | 100TB | 5TB |
| Q3 | Tenant 1.2.1 | Sales E | UK | SSD | 20TB | 10TB |
| Q4 | Tenant 1.2.1 | Sales E | Japan | SSD | 40TB | 30TB |
| Q5 | Tenant 1.2.2 | Sales W | Japan | SSD | 30TB | 30TB |
| Q6 | Tenant 2 | Company B | US-West | HDD | 80TB | 1TB |
| Q7 | Tenant 2 | Company B | US-West, Japan | SSD | 70TB | 5TB |
| Q8 | Tenant 2.2 | Team 2 | US-West, Japan | SSD | 50TB | 20TB |

QUOTA MANAGEMENT SYSTEM AND QUOTA MANAGEMENT METHOD

BACKGROUND OF THE INVENTION

1. Field of the Invention

The present invention generally relates to quota management.

2. Description of Related Art

A storage device is generally owned or managed by a provider, and the provider allocates a capacity to a consumer with a commitment term of a certain term (for example, several years). The consumer usually belongs to a part of a plurality of tenants.

A "quota" permits the consumer to store data in the storage device and limits an amount of data that can be stored. As quota management, for example, a technique disclosed in PTL 1 is known.

CITATION LIST

Patent Literature

PTL 1: U.S. Pat. No. 11,003,497

SUMMARY OF THE INVENTION

According to the quota management disclosed in PTL 1, the provider can set a quota for a storage device at a single location.

However, there is a tenant (for example, a company) that places data on storage devices in a plurality of locations (for example, on-premises, near-cloud, and public cloud storage devices), but when the quota management disclosed in PTL 1 is adopted for such a tenant, quota management for each location will be required, which will be a heavy burden.

As the quota is changed, it may be necessary to change (for example, increase or decrease) a hardware resource. For example, when the quota is changed to a quota having a larger capacity upper limit, it may be necessary to increase a storage device such as a hard disk drive (HDD) and a solid state drive (SSD). Since changing the hardware resource requires time and effort, the change of the quota generally require an approval of a human, and the quota is associated with a certain commitment term. It is conceivable to set a quota associated with a larger capacity upper limit more than necessary, but in this case, it is conceivable that a usage rate of the hardware resource is low and many unnecessary hardware resources are required.

A quota management system receives a quota request in which a tenant, one or more locations, and a capacity upper limit related to a requested quota are designated, and executes conflict determination (of determining whether there is a conflict for a requested quota, which is the quota associated with the tenant, the one or more locations, and the capacity upper limit designated in the quota request) based on tenant information and quota information. If a result of the conflict determination is false, the quota management system adds, to the quota information, information related to the requested quota associated with the tenant, the location, and the capacity upper limit which are designated. The tenant information includes information representing each of a plurality of tenants of a storage system. The storage system includes a plurality of storage devices at a plurality of locations. The quota information includes information related to a quota of the storage system. For each quota, the information related to the quota includes information representing the tenant, one or more locations among the plurality of locations, and a capacity upper limit. For each of the plurality of locations, a capacity usable by the tenant among a capacity of the storage device at the location is equal to or less than the capacity upper limit of the quota defined in the quota information, the quota corresponding to the tenant and the one or more locations including the location.

According to the invention, it is possible to reduce a burden of managing a quota for each of a plurality of tenants of storage devices at a plurality of locations.

BRIEF DESCRIPTION OF THE DRAWINGS

FIG. 6 shows a configuration example of a location table;
FIG. 7 shows a configuration example of a quota table.

DESCRIPTION OF EMBODIMENTS

Figure 1:
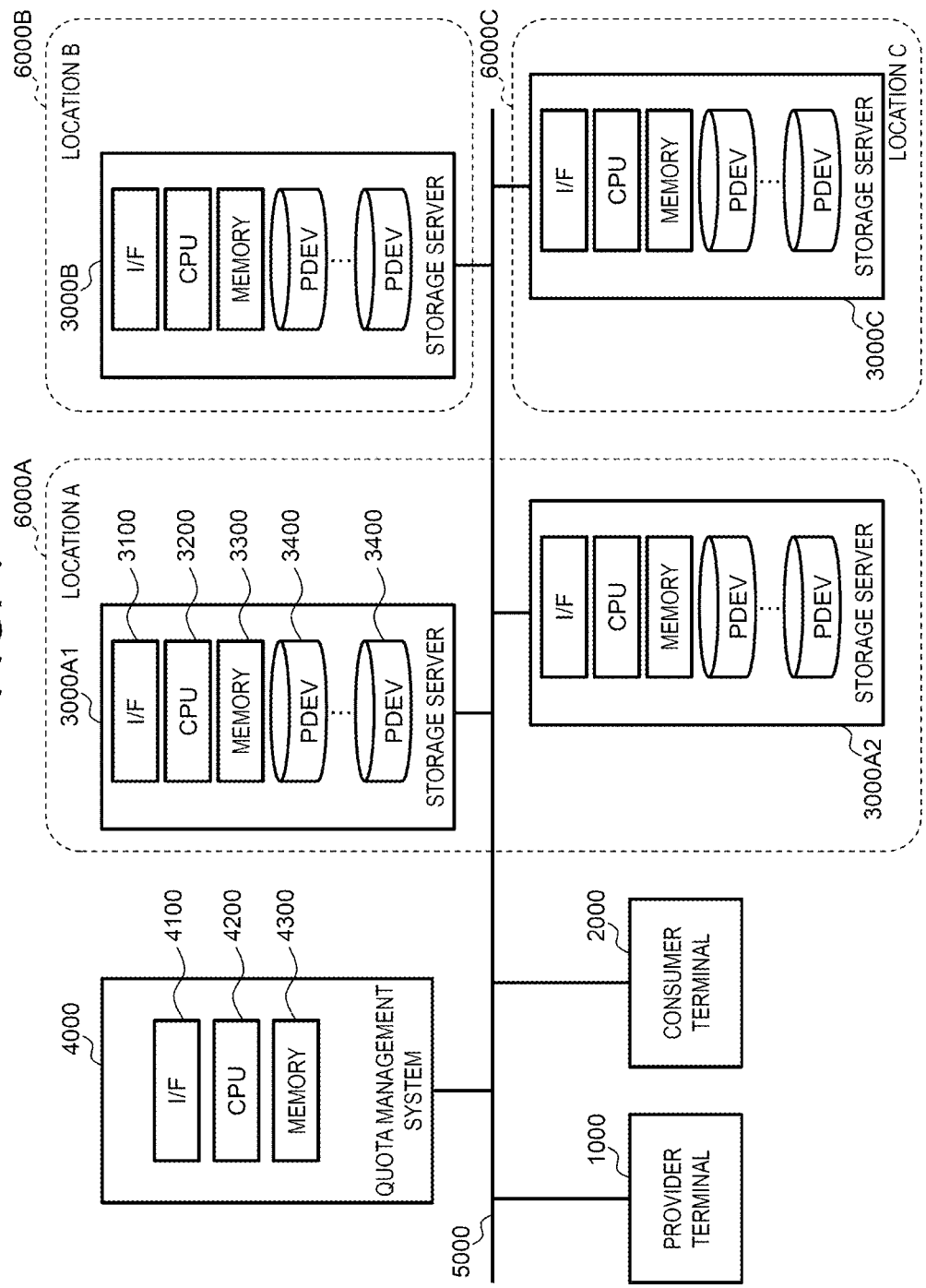
FIG. 1 shows a configuration example of an entire system including a quota management system according to an embodiment.

In the following description, an "interface device" may be one or more interface devices. The one or more interface devices may be at least one of the following.

One or more input/output (I/O) interface devices. The input/output (I/O) interface device is an interface device for at least one of an I/O device and a remote display computer. The I/O interface device for the display computer may be a communication interface device. The at least one I/O device may be a user interface device, for example, an input device such as a keyboard and a pointing device, or an output device such as a display device.

One or more communication interface devices. The one or more communication interface devices may be one or more communication interface devices of the same type (for example, one or more network interface cards (NICs)) or two or more communication interface devices of different types (for example, NIC and host bus adapter (HBA)).

In the following description, a "memory" is one or more memory devices, which are examples of one or more storage devices, and may be typically a main storage device. At least one memory device in the memory may be a volatile memory device or a non-volatile memory device.

In the following description, a "persistent storage" may be one or more persistent storage devices, which are examples of one or more storage devices. The persistent storage device may be typically a non-volatile storage device (for example, an auxiliary storage device), and specifically, for example, a hard disk drive (HDD), a solid state drive (SSD), a non-volatile memory express (NVME) drive, or a storage class memory (SCM).

In the following description, a "processor" may be one or more processor devices. At least one processor device may be typically a microprocessor device such as a central processing unit (CPU), and may be another type of processor device such as a graphics processing unit (GPU). At least one processor device may be a single core or a multi-core. At least one processor device may be a processor core. At least one processor device may be a broadly defined processor device such as a circuit (for example, a field-programmable gate array (FPGA), a complex programmable logic device (CPLD), or an application specific integrated circuit (ASIC)) that is a collection of gate arrays in a hardware description language for performing a part or all the process.

Further, in the following description, a process may be described with an execution subject of the process as a program, but since the program is executed by the processor (typically, the process executed by the program being executed by the processor is executed using a storage and/or an interface device as appropriate), the process described with the program as a subject may be a process executed by the processor or a device including the processor. The program may be installed from a program source. The program source may be, for example, a program distribution computer or a computer-readable recording medium (for example, a non-transitory recording medium). A description of each program is an example, and a plurality of programs may be integrated into one program, or one program may be divided into a plurality of programs.

In the following description, data that can be output in response to an input may be described by an expression such as "xxx table", whereas the data may be data of any structure (for example, may be structured data or unstructured data), and may be a learning model such as a neural network, a genetic algorithm, or a random forest that generates an output in response to an input. Therefore, the "xxx table" can be referred to as "xxx data". In the following description, a configuration of each table is an example. One table may be divided into two or more tables, or all or some of two or more tables may be one table.

In the following description, when elements of the same type are described without being distinguished, a common reference numeral may be used, and when elements of the same type are distinguished, reference numerals may be used.

FIG. 1 shows a configuration example of an entire system including a quota management system according to an embodiment of the invention.

A quota management system 4000 can communicate with a provider terminal 1000, a consumer terminal 2000, and a plurality of storage servers 3000 via a communication network 5000 (for example, the Internet or a wide area network (WAN)). At least a plurality of provider terminals 1000 or consumer terminals 2000 may be present.

The provider terminal 1000 is an information processing terminal (for example, a personal computer or a smartphone) of a provider. The provider is a user having a resource provider role assigned to one or more tenants. The provider uses the provider terminal 1000 to approve or set (assign) a quota to the quota management system 4000 for a tenant for which the provider is in responsible. One provider may be able to approve or set the quota for any tenant without being assigned to a specific tenant.

The consumer terminal 2000 is an information processing terminal of a consumer. The consumer is a user who belongs to one or more tenants and has a role of a resource consumer. The consumer uses the consumer terminal 2000 to request the quota management system 4000 for a quota for the tenant to which the consumer belongs, or to request provision of a logical volume for the tenant to which the consumer belongs. One consumer may be able to request provision of the quota and the logical volume for any tenant without belonging to a specific tenant.

The plurality of storage servers 3000 are present at a plurality of different locations 6000. For example, according to the example shown in FIG. 1, there are locations 6000A to 6000C, storage servers 3000A1 and 3000A2 at the location 6000A, a storage server 3000B at the location 6000B, and a storage server 3000C at the location 6000C. The storage servers 3000B and 3000C at the different locations 6000B and 6000C may be communicably connected without requiring the communication network 5000. The location 6000 may refer to any of a site, a geographical region, a data center, and a network area. The location 6000 may be referred to as the site. Further, the location 6000 may refer to a storage environment, such as an on-premises environment, a near-cloud environment, or a public cloud environment. The locations 6000 having different meanings (definitions) may be mixed. In the present embodiment, the location 6000 may be a geographical region.

The storage server 3000 may be a physical storage device or a logical storage device (for example, a storage device formed using logical partitioning, or a cloud storage). The storage server 3000 includes an interface device 3100, a memory 3300, one or more physical storage devices (PDEVs) 3400, and a CPU 3200 connected thereto. The interface device 3100 is connected to the communication network 5000. The storage server 3000 provides the logical volume and can input and output data to and from the logical volume in response to an input/output (I/O) request designating the logical volume.

In the present embodiment, the quota management system 4000 is a physical computer system (one or more physical computers), but may be a logical computer system (for example, a virtual machine or a cloud computing system) based on the physical computer system. The quota management system 4000 (for example, a server) includes an interface device 4100, a memory 4300, and a CPU 4200 connected thereto. The interface device 4100 is connected to the communication network 5000. The quota management system 4000 manages the quota for each of the plurality of tenants of the plurality of storage servers 3000 at the plurality of locations 6000.

Figure 2:
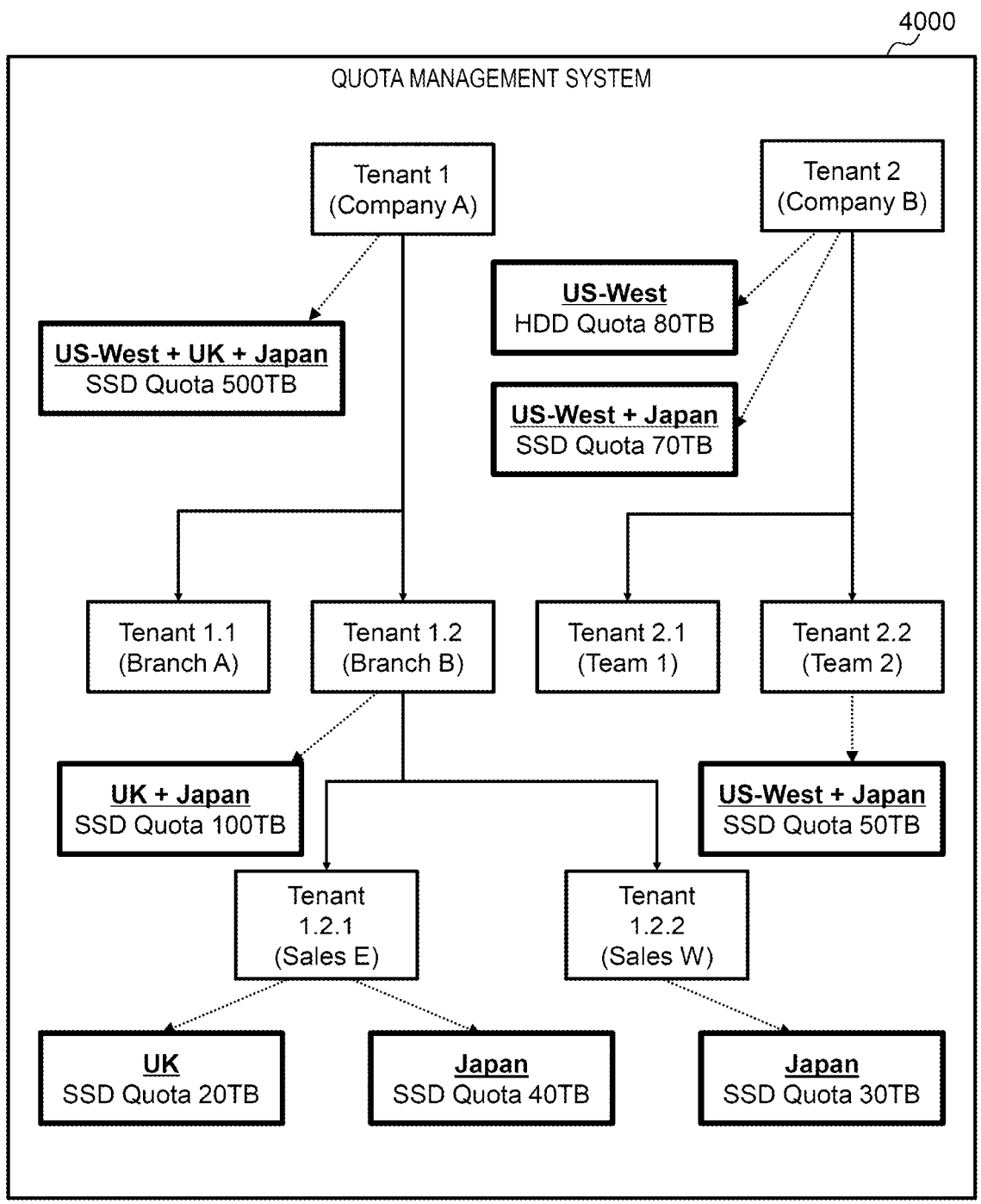
FIG. 2 schematically shows an example of quota management in the quota management system.

FIG. 2 schematically shows an example of quota management in the quota management system 4000.

The locations 6000A to 6000C are US-West, UK, and Japan. The quota management system 4000 hierarchically manages the plurality of tenants. The tenant may be a company, an organization, a department, a branch, or a team.

Tenant management may be management of a graph (tree) in which the tenant is a node and a hierarchical relationship between the tenants is an edge. In this paragraph, one tenant is referred to as a "tenant of interest". Among tenants having higher ranking than the tenant of interest, a tenant that is higher by one rank than the tenant of interest can be called a "parent tenant", and among tenants having lower ranking than the tenant of interest, a tenant that is lower by one rank than the tenant of interest can be called a "child tenant." A concept of "higher-ranking/lower-ranking" or "parent/child" for the tenant may differ depending on a position of managing (for example, monitoring), but may be defined according to a predetermined standard. For example, when there is a "connection relationship" between the tenants, one of the tenants may be a lower-ranking tenant, and the other tenant that is dependent on the one tenant (based on the one tenant) may be a higher-ranking tenant. When there is an "inclusive relationship" between the tenants, one of the tenants may be a lower-ranking tenant, and the other tenant that includes the one tenant may be a higher-ranking tenant. According to the example shown in FIG. 2, there are Company A and Company B as highest-ranking tenants. Child tenants of Company A are Branch A and Branch B. Child tenants of Branch B are Sales E and Sales W. Child tenants of Company B are Team 1 and Team 2.

The quota management may include associating the quota with the tenant. The quota associated with the tenant includes a storage type, a capacity upper limit, and a location as elements of the quota.

The quota management system 4000 can respectively associate the quotas with the plurality of tenants having the hierarchical relationship or associate a plurality of quotas with the same tenant as long as no quota conflict occurs. Although details of conditions corresponding to the quota conflict will be described later, an example of the quota is as follows according to FIG. 2.

In a quota associated with Company A, a location is "US-West, UK, and Japan", a storage type is "SSD", and a capacity upper limit is "500 TB". That is, Company A can place data up to a total of 500 TB on SSD (for example, a logical volume to which an SSD-based storage area is allocated) of the storage server 3000 in any location 6000 among US-West, UK, and Japan.

In a quota associated with Branch B, a location is "UK and Japan", a storage type is "SSD", and a capacity upper limit is "100 TB". The quota of Branch B does not conflict with the quota of Company A, which is a parent tenant of Branch B. This is because the quota of Company A includes "Japan" of Branch B (child tenant) as the location, includes "SSD" of Branch B as the storage type, and has the capacity upper limit of "100 TB" or more of Branch B.

Two quotas are associated with Company B. In one quota, a location is "US-West", a storage type is "HDD", and a capacity upper limit is "80 TB". In the other quota, a location is "US-West and Japan", a storage type is "SSD", and a capacity upper limit is "70 TB". These quotas do not conflict with each other. This is because the storage type is different.

Figure 3:
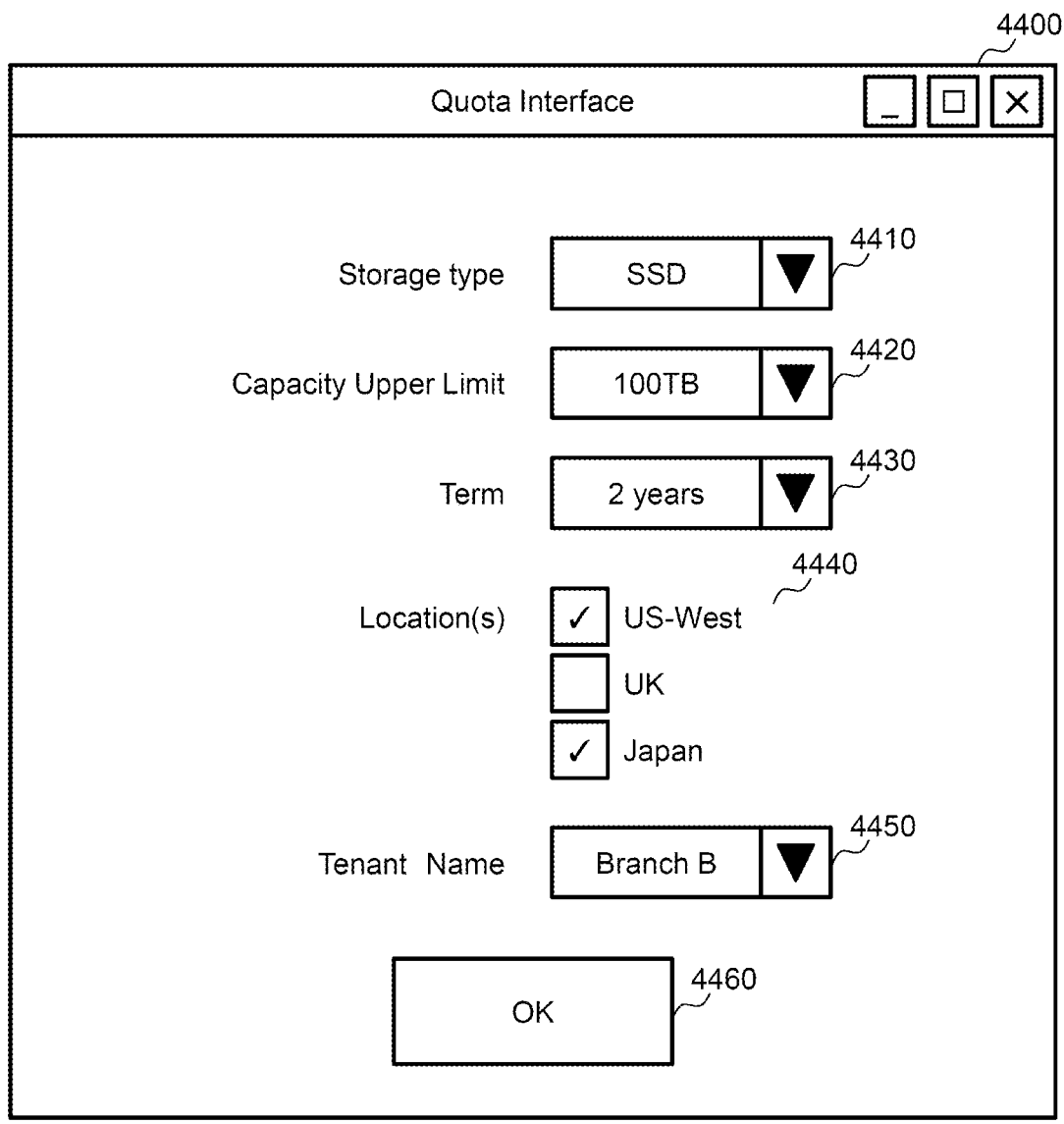
FIG. 3 shows an example of a quota interface.

FIG. 3 shows an example of a quota interface.

A quota interface 4400 is an interface provided by the quota management system 4000 for requesting or setting the quota, and is, for example, an application programming interface (API) accessed by the program or a user interface (UI) provided to a user. In the present embodiment, the quota interface 4400 is a graphical user interface (GUI) that can be provided to both the provider terminal 1000 and the consumer terminal 2000. Both the provider and the consumer can communicate with the quota management system 4000 via the quota interface 4400. The quota interface 4400 includes input fields, that is, a storage type 4410, a capacity upper limit 4420, a term 4430, a location 4440, and a tenant name 4450. Further, the quota interface 4400 includes an action button called OK 4460. The input field and the action button are examples of GUI components.

The storage type 4410 receives an input of a storage type targeted for the quota. Although a storage device type such as SSD and HDD is adopted as the storage type in the present embodiment, a storage data type such as a block storage, a file storage, and an object storage or other types may be adopted instead of or in addition to the storage device type.

The capacity upper limit 4420 receives an input of the capacity upper limit as the quota.

The term 4430 receives an input of a commitment term (term of a commitment and validity) of the quota. For example, "2 years" means that the consumer belonging to the tenant associated with the quota cannot change the quota for two years. At least the term 4430 of the input fields illustrated in FIG. 3 may not be provided in the quota interface 4400. In this case, the commitment term of the quota may be unlimited.

The location 4440 receives an input of one or more locations covered by the quota. For example, selection of "US-West" and "Japan" means that the tenant can place data in both locations to the extent that total capacity consumption in both the locations is less than or equal to the capacity upper limit.

The tenant name 4450 receives an input of a tenant name of the tenant associated with the quota.

Figure 8:
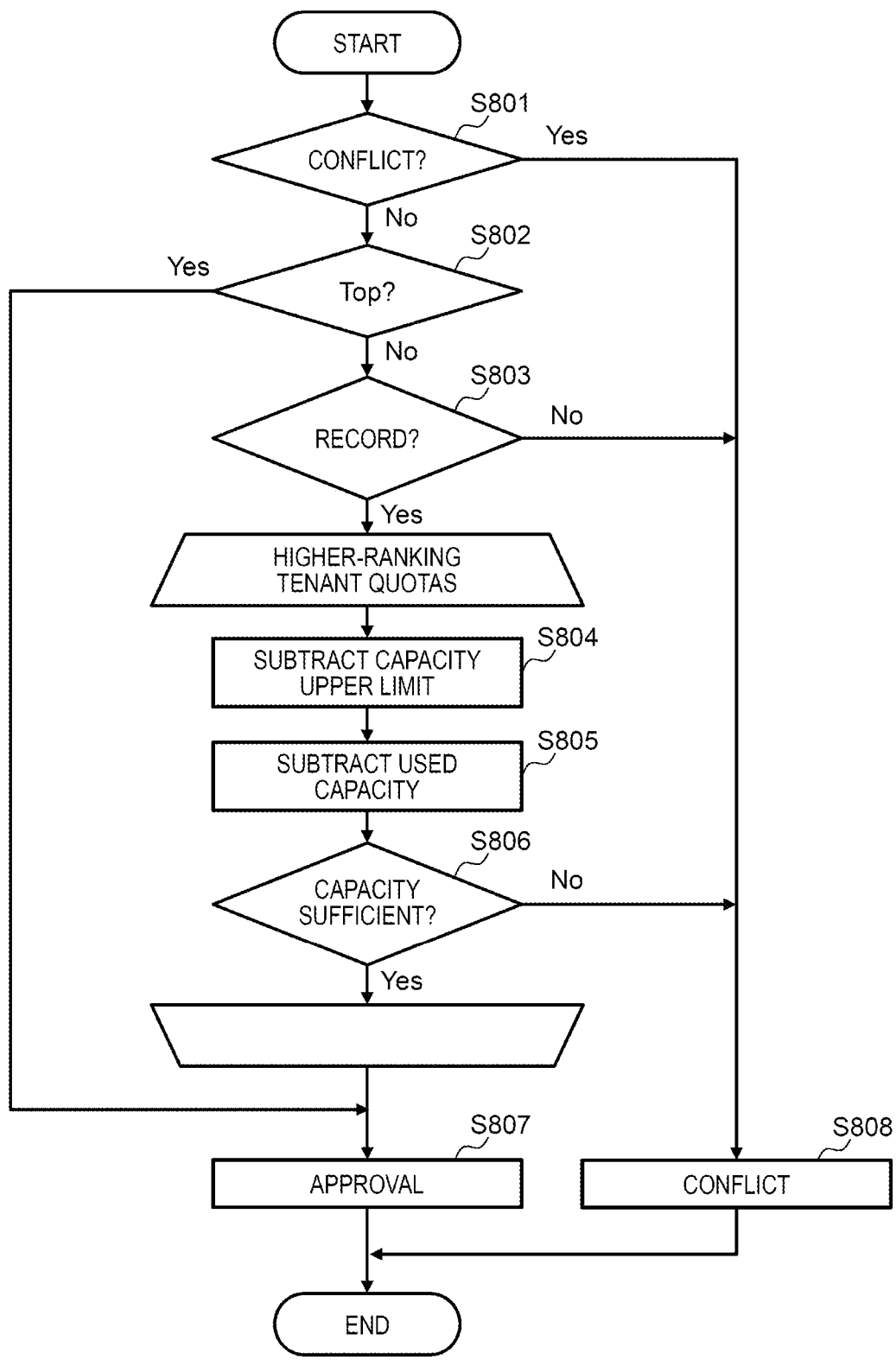
FIG. 8 shows a flow of a quota determination process.

When the OK 4460 is pressed, a quota determination process shown in FIG. 8 is started.

Figures 4, 5:
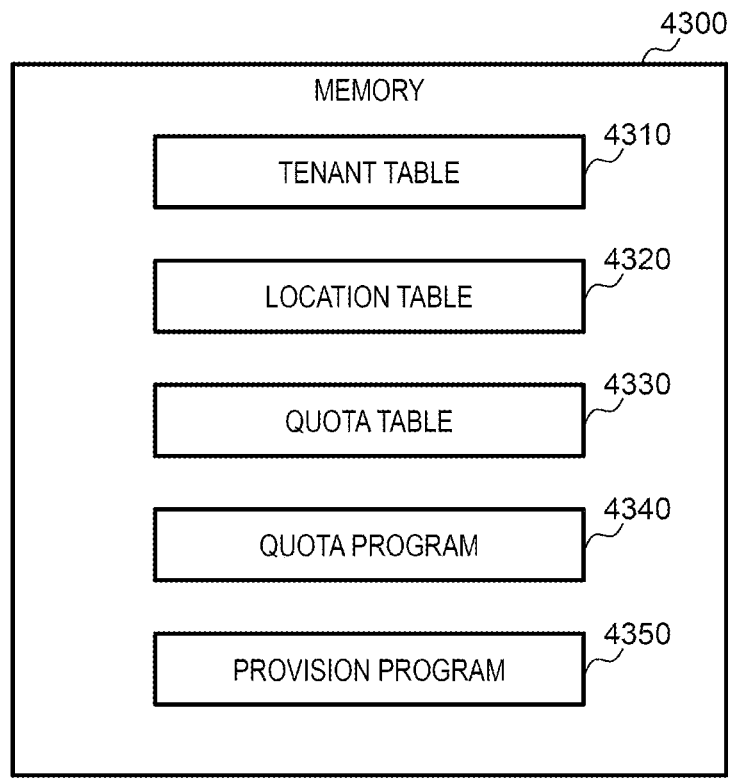
FIG. 4 shows an example of tables and programs stored in a memory of the quota management system.
FIG. 5 shows a configuration example of a tenant table.

FIG. 4 shows an example of tables and programs stored in the memory 4300 of the quota management system 4000.

The memory 4300 stores data such as a tenant table 4310, a location table 4320, and a quota table 4330, and programs such as a quota program 4340 and a provision program 4350.

FIG. 5 shows a configuration example of the tenant table 4310.

The tenant table 4310 includes a record for each tenant. The record includes information such as a tenant ID 4311, a tenant name 4312, and a parent tenant ID 4313.

The tenant ID 4311 represents an ID of the tenant. The tenant name 4312 represents a name of the tenant. The parent tenant ID 4313 represents an ID of a parent tenant of the tenant. "Top" of the parent tenant ID 4313 represents that there is no parent tenant and the tenant is the highest-ranking tenant. Further, for each tenant, there may be one or more child tenants, but there may be zero or one parent tenant.

The tenant table 4310 is created or updated by the provider, for example.

FIG. 6 shows a configuration example of the location table 4320.

The location table 4320 includes a record for each location. The record includes information such as a location 4321 and a storage type 4322.

The location 4321 represents an ID of the location 6000. The storage type 4322 represents a storage type of the storage server 3000 at the location 6000.

The location table 4320 is created or updated by the provider, for example. The location table 4320 may be created or updated by the quota program 4340 based on the data collected from the storage server 3000 at each location 6000. For example, when all HDDs are removed from the storage server 3000 belonging to US-West, the quota program 4340 may receive data representing an HDD removal from the storage server 3000 belonging to US-West and delete "HDD" from the storage type 4322 corresponding to US-West.

FIG. 7 shows a configuration example of the quota table 4330.

The quota table 4330 includes a record for each quota. The record includes information such as a quota ID 4331, a tenant ID 4332, a tenant name 4333, a location 4334, a storage type 4335, a capacity upper limit 4336, and a used capacity 4337.

The quota ID 4331 represents an ID of the quota. The tenant ID 4332 represents an ID of a tenant associated with the quota. The tenant name 4333 represents a name of the tenant associated with the quota. The location 4334 represents one or more locations covered by the quota. The storage type 4335 represents a storage type of the quota. The capacity upper limit 4336 represents a capacity upper limit of the quota. The used capacity 4337 represents a used capacity of the capacity upper limit of the quota.

Hereinafter, an example of a process executed in the present embodiment will be described.

FIG. 8 shows a flow of the quota determination process.

The quota determination process is started, for example, when the OK 4460 on the quota interface 4400 is pressed.

The quota program 4340 determines whether a conflicting quota is already associated with a designated tenant (tenant corresponding to a tenant name designated in the tenant name 4450) (S801). Specifically, for example, the quota program 4340 determines whether there is a record that satisfies all of the following conditions in the quota table 4330.

There is the tenant name 4333 representing the tenant name designated in the tenant name 4450 on the quota interface 4400.

There is the location 4334 representing at least one of the one or more locations selected in the location 4440 on the quota interface 4400.

There is the storage type 4335 representing the storage type designated in the storage type 4410 on the quota interface 4400.

When a determination result in S801 is true (S801: Yes), the quota program 4340 returns a response indicating a conflict (S808). In the process shown in FIG. 8, a destination of the response is a destination (that is, the provider or the consumer) on the quota interface 4400. The response returned in S808 may include information representing information corresponding to the conflict among information designated on the quota interface 4400.

When the determination result in S801 is false (S801: No), the quota program 4340 refers to the tenant table 4310 and determines whether the designated tenant is the highest-ranking tenant (the parent tenant ID 4313 corresponding to the designated tenant is "Top") (S802). When a determination result in S802 is true (S802: Yes), since there is no conflict in a quota newly created for the highest-ranking tenant, the quota program 4340 returns a response indicating an approval (S807).

When the determination result in S802 is false (S802: No), the quota program 4340 determines, based on the quota table 4330 and the tenant table 4310, whether the quota table 4330 includes a record that satisfies the following conditions for all higher-ranking tenants of the designated tenant.

The one or more locations represented by the location 4334 in the record include all of the one or more locations selected in the location 4440 on the quota interface 4400.

The storage type 4335 in the same record represents the storage type designated in the storage type 4410 on the quota interface 4400.

When there is no record satisfying the above conditions for at least one higher-ranking tenant, a determination result in S803 is false. When the determination result in S803 is false (S803: No), since at least a part of the quota requested for the designated tenant exceeds a range of a quota of the higher-ranking tenant, the quota program 4340 executes S808.

When there is a record satisfying the above conditions for each of all the higher-ranking tenants, the determination result in S803 is true. A quota corresponding to such a record is hereinafter referred to as "higher-ranking tenant quota" in the description of FIG. 8 (and FIG. 9). When the determination result in S803 is true (S803: Yes), if there is an unprocessed higher-ranking tenant quota in S804 to S806, the quota program 4340 selects such a higher-ranking tenant quota and executes S804 to S806. In other words, S804 to S806 are repeated until there is no unprocessed higher-ranking tenant quota in S804 to S806 (or until S806: Yes is detected for any higher-ranking tenant quota). S804 to S806 will be described by taking one higher-ranking tenant quota as an example.

The quota program 4340 subtracts a capacity upper limit of the designated tenant (capacity designated in the capacity upper limit 4420) from the capacity upper limit 4336 of the higher-ranking tenant quota (S804). For example, according to the examples shown in FIGS. 2, 3, and 7, since the capacity upper limit 4336 of the higher-ranking tenant quota is the capacity upper limit "500 TB" of Company A, the quota program 4340 subtracts the capacity upper limit "100 TB" of the designated tenant "Branch B" from "500 TB". As a result, "400 TB" is obtained.

Next, the quota program 4340 subtracts the used capacity 4337 of the higher-ranking tenant quota from a value calculated in S804 (S805). For example, the quota program 4340 subtracts a used capacity "2 TB" of the higher-ranking tenant "Company A" from the value "400 TB" calculated in S804. As a result, "398 TB" is obtained.

Next, the quota program 4340 determines whether a capacity is sufficient (S806). Specifically, the quota program 4340 executes a capacity determination process in FIG. 9. When a result of the capacity determination process is a conflict, a determination result in S806 is false (S806: No), and S808 is executed. When the result of the capacity determination process is a non-conflict, the determination result in S806 is true (S806: Yes). If there is the unprocessed higher-ranking tenant quota in S804 to S806, such a higher-ranking tenant quota is selected, and S804 to S806 are executed. If there is no unprocessed higher-ranking tenant quota in S804 to S806, S807 is executed.

In S807, the quota program 4340 may associate, with the designated tenant, the quota requested through the quota interface 4400 (may add the record of the quota requested for the designated tenant to the quota table 4330). When the destination of the quota interface 4400 is the consumer, the quota program 4340 may notify the provider of the designated tenant of information indicating that there is a quota request and that no quota conflict is detected. When an approval of the provider is obtained in response to a notification, the quota program 4340 may associate the requested quota with the designated tenant.

Figure 9:
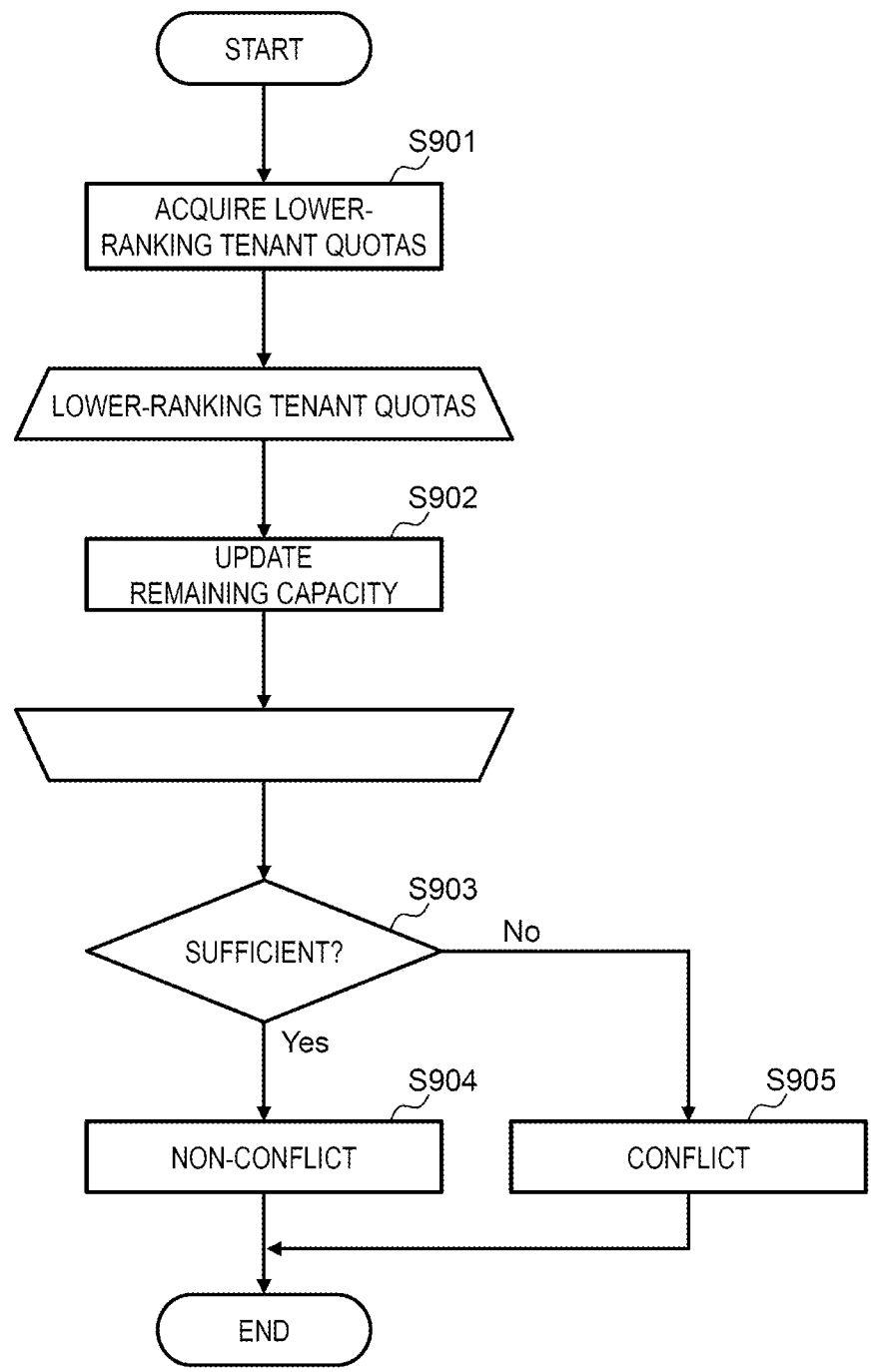
FIG. 9 shows a flow of a capacity determination process (details of S806 in FIG. 8)

FIG. 9 shows a flow of the capacity determination process (details of S806 in FIG. 8).

The quota program 4340 executes S901. Specifically, the quota program 4340 searches the tenant table 4310 for a record having a tenant ID of the designated tenant as the parent tenant ID 4313. If the designated tenant is not the lowest-ranking tenant, typically, one or more records, that is, one or more lower-ranking tenants of the designated tenant are found. The quota program 4340 acquires, for each of the one or more lower-ranking tenants, a record satisfying all of the following conditions from among records of quotas of the lower-ranking tenants.

The tenant name 4333 in the record represents a tenant name of the lower-ranking tenant.

All of one or more locations represented by the location 4334 in the same record are included in the one or more locations selected in the location 4440 on the quota interface 4400.

The storage type 4335 in the same record represents the storage type designated in the storage type 4410 on the quota interface 4400.

A quota corresponding to the record that satisfies the above conditions is hereinafter referred to as a "lower-ranking tenant quota" in the description of FIG. 9. If there is an unprocessed lower-ranking tenant quota in S902, the quota program 4340 selects such a lower-ranking tenant quota and executes S902. That is, the quota program 4340 updates a remaining capacity by subtracting the capacity upper limit 4336 of the lower-ranking tenant quota from a latest remaining capacity (S902). If S902 is executed for the first time, the "latest remaining capacity" is the value (for example, "398 TB") calculated in S805. When S902 is executed for the second time or thereafter, the "latest remaining capacity" is a remaining capacity obtained in previous S902. For example, according to the examples shown in FIGS. 2, 3, 7 and 8, in the first S902, the quota program 4340 calculates a remaining capacity "378 TB" by subtracting a capacity upper limit "20 TB" of Sales E (UK) from the latest remaining capacity "398 TB". Next, in the second S902, the quota program 4340 calculates a remaining capacity "338 TB" by subtracting a capacity upper limit "40 TB" of Sales E (Japan) from the latest remaining capacity "378 TB". Next, in the third S902, the quota program 4340 calculates a remaining capacity "308 TB" by subtracting a capacity upper limit "30 TB" of Sales W from the latest remaining capacity "338 TB".

S902 is repeated until there is no unprocessed lower-ranking tenant quota in S902. That is, after S902, the quota program 4340 determines whether there is the unprocessed lower-ranking tenant quota in S902. If a determination result is true, the quota program 4340 selects such a lower-ranking tenant quota and executes S902. When the determination result is false, the process proceeds to S903.

The quota program 4340 determines whether a finally calculated remaining capacity is equal to or greater than a threshold (for example, "0") (S903).

When a determination result in S903 is true (S903: Yes), the quota program 4340 outputs a non-conflict (S904). As a result, the determination result in S806 is true (S806: Yes).

When the determination result in S903 is false (S903: No), the quota program 4340 outputs a conflict (S905). As a result, the determination result in S806 is false (S806: No).

In the process shown in FIG. 9, the quota program 4340 may execute S903 each time S902 is executed, execute S905 when S903: No is detected, and end the process in FIG. 9 even if there is the unprocessed lower-ranking tenant quota in S902.

Figure 10:
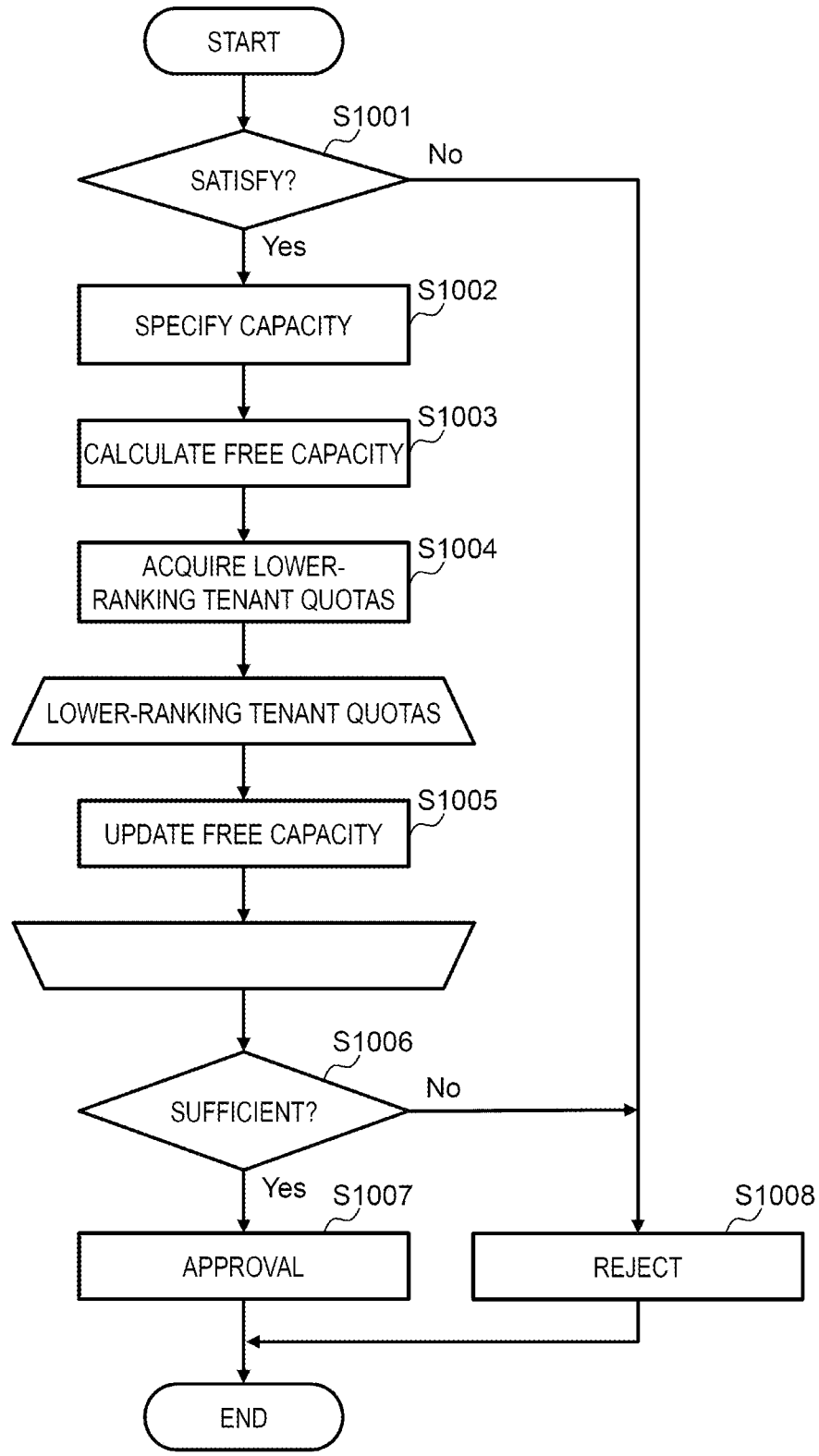
FIG. 10 shows a flow of a capacity provision process.

FIG. 10 shows a flow of a capacity provision process.

The provision program 4350 starts the capacity provision process in response to a capacity request from the provider terminal 1000 or the consumer terminal 2000. In the capacity request, for example, a tenant name, a location, a storage type, and a capacity are designated. Further, the capacity is provided as a logical volume having the capacity.

The provision program 4350 determines whether there is a record satisfying all the following conditions in the quota table 4330 (S1001).

The tenant name 4333 in the record represents a tenant name designated by the capacity request.
The storage type 4335 in the same record represents a storage type designated in the capacity request.
The one or more locations represented by the location 4334 in the same record include a location designated in the capacity request.

When there is no record that satisfies the above conditions, a determination result in S1001 is false. When the determination result in S1001 is false (S1001: No), since a request content of the capacity request exceeds a quota range of a tenant designated in the capacity request, the provision program 4350 returns a response indicating rejection to the capacity request to a transmission source (that is, the provider or the consumer) of the capacity request (S1008).

When there is a record that satisfies the above conditions, the determination result in S1001 is true. When the determination result in S1001 is true (S1001: Yes), the provision program 4350 specifies the capacity upper limit 4336 and the used capacity 4337 from the record satisfying the conditions (S1002), and calculates a free capacity by subtracting the used capacity 4337 from the capacity upper limit 4336 (S1003). For example, when the record that satisfies the above conditions is a record having a quota ID "Q2", the specified capacity upper limit 4336 is "100 TB" and the specified used capacity 4337 is "5 TB", so that the calculated free capacity is "95 TB" (=100 TB-5 TB).

After S1003, the provision program 4350 acquires a record that satisfies the following conditions in the quota table 4330 for all the lower-ranking tenants of the designated tenants based on the quota table 4330 and the tenant table 4310 (S1004).

One or more locations represented by the location 4334 in the record include the location designated in the capacity request.
The storage type 4335 in the same record represents the storage type designated in the capacity request.

A quota corresponding to the record that satisfies the above conditions is hereinafter referred to as a "lower-ranking tenant quota" in the description of FIG. 10. If there is an unprocessed lower-ranking tenant quota in S1005, the provision program 4350 selects such a lower-ranking tenant quota and executes S1005. That is, the provision program 4350 updates the free capacity by subtracting the capacity upper limit 4336 of the lower-ranking tenant quota from a latest free capacity (S1005). When S1005 is executed for the first time, the "latest free capacity" is the value calculated in S1003 (for example, "95 TB"). When S1005 is executed for the second time or thereafter, the "latest free capacity" is a free capacity obtained in previous S1005. For example, according to the examples shown in FIGS. 2, 3, and 10, in the first S1005, the provision program 4350 calculates a free capacity "75 TB" by subtracting the capacity upper limit "20 TB" of Sales E (UK) from the latest free capacity "95 TB". Next, in the second S1005, the provision program 4350 calculates a free capacity "35 TB" by subtracting the capacity upper limit "40 TB" of Sales E (Japan) from the latest free capacity "75 TB". Next, in the third S1005, the provision program 4350 calculates a free capacity "5 TB" by subtracting the capacity upper limit "30 TB" of Sales W from the latest free capacity "35 TB".

S1005 is repeated until there is no unprocessed lower-ranking tenant quota in S1005. That is, after S1005, the provision program 4350 determines whether there is the unprocessed lower-ranking tenant quota in S1005. If a determination result is true, the provision program 4350 selects such a lower-ranking tenant quota and executes S1005. When the determination result is false, the processing proceeds to S1006.

The provision program 4350 determines whether a finally calculated free capacity is equal to or larger than a capacity designated in the capacity request (S1006).

When a determination result in S1006 is false (S1006: No), the provision program 4350 executes S1008. When the determination result in S1006 is true (S1006: Yes), the provision program 4350 returns a response indicating an approval (S1007).

In S1007, the provision program 4350 may allocate a logical volume having a requested capacity to the designated tenant, and add the requested capacity to the used capacity 4337 of the quota of the designated tenant. When the transmission source of the capacity request is the consumer, the provision program 4350 may notify the provider of the designated tenant of information indicating that the capacity request has been made and the capacity request has been approved. When an approval of the provider is obtained in response to the notification, the provision program 4350 may allocate the logical volume having the requested capacity to the designated tenant (and may further add the requested capacity to the used capacity 4337 of the quota of the designated tenant).

In the process shown in FIG. 10, the provision program 4350 may execute S1006 each time S1005 is executed, execute S1008 when S1006: No is detected, and end the process in FIG. 10 even if there is the unprocessed lower-ranking tenant quota in S1005.

Although one embodiment has been described above, this embodiment is an example for describing the invention, and the scope of the invention is not limited to this embodiment. The invention can be implemented in various other forms.

The above description can be summarized as follows, for example. The f following summary may include a supplementary description and a description of modifications to the above.

The quota management system 4000 includes the interface device 4100, the memory 4300 (an example of a storage), and the CPU 4200 (an example of a processor) connected to the interface device 4100 and the memory 4300. The interface device 4100 can communicate with a storage system. The memory 4300 stores the tenant table 4310 (an example of tenant information) including information indicating each of a plurality of tenants of the storage system, and the quota table 4330 (an example of quota information) including information related to a quota of the storage system.

The storage system includes a plurality of storage devices at the plurality of locations 6000. For each location 6000, the storage device is, for example, one or more storage servers 3000. The storage device provides a capacity (typically, a logical volume having the capacity).

For each quota, the information related to the quota includes the tenant, the one or more locations 6000, and information representing a capacity upper limit (for example, the tenant ID 4332, the tenant name 4333, the location 4334, and the capacity upper limit 4336).

For each of the plurality of locations 6000, the capacity usable by the tenant among the capacity of the storage device at the location 6000 is equal to or less than the capacity upper limit of the quota defined in the quota (quota table 4330) corresponding to the tenant and one or more locations including the location 6000. Such control may be executed by, for example, the CPU 4200 that executes the quota program 4340, or may be executed by the storage device at each location 6000.

The CPU 4200 receives a quota request in which a tenant, one or more locations, and a capacity upper limit related to a requested quota are designated. The CPU 4200 executes conflict determination based on the tenant table 4310 and the quota table 4330. The conflict determination determines whether there is a conflict regarding the requested quota (quota associated with the tenant, the one or more locations, and the capacity upper limit designated in the quota request). If a result of the conflict determination is false, the CPU 4200 adds, to the quota table 4330, information related to the requested quota associated with the designated tenant, the location, and the capacity upper limit.

Accordingly, it is possible to reduce a burden of managing the quota for each of the plurality of tenants of the storage devices at the plurality of locations 6000. According to the quota management system 4000, it is possible to centralize management of the tenants and the quotas in the storage devices at the plurality of locations 6000 and realize reduction and simplification of management work. For example, a user such as a provider or a consumer can designate all or a part of the plurality of locations 6000 based on a policy of the tenant or a legal regulation applied to the locations 6000. Further, the "quota request" may be a request for newly setting the quota or a request for changing an existing quota. Furthermore, each of the plurality of locations 6000 may be any one of a site, a geographical region, a data center, and a network area.

The tenant table 4310 may represent a hierarchical relationship among the plurality of tenants. The conflict determination may include determining whether there is a target higher-ranking tenant quota for the higher-ranking tenant of the designated tenant (for example, S803). The "target higher-ranking tenant quota" may be a quota associated with one or more locations including all of the one or more designated locations among one or more quotas of the higher-ranking tenant of the designated tenant (for example, when the one or more designated locations are "UK" and "Japan", the "target higher-ranking tenant quota" may be a quota associated with two or more locations including "UK" and "Japan"). When there is no target higher-ranking tenant quota for at least one higher-ranking tenant of the designated tenant (for example, S803: No), the result of the conflict determination may be false. In this way, in centralized management of the quotas of the storage devices at the plurality of locations 6000, from the viewpoint of the tenant hierarchical relationship and the location, it is possible to avoid the conflict of the quota (here, setting, for the designated tenant, a quota that is outside the location range of the quota of the higher-ranking tenant).

The conflict determination may include capacity determination (for example, S804 to S806) of determining whether the designated capacity upper limit satisfies conditions. The capacity determination may be determination based on a capacity upper limit associated with the target higher-ranking tenant quota of the higher-ranking tenant of the designated tenant and capacity upper limits respectively associated with target lower-ranking tenant quotas of one or more lower-ranking tenants of the designated tenant. The "target lower-ranking tenant quota" may be a quota associated with one or more locations that are all included in the one or more designated locations among one or more quotas of the lower-ranking tenant of the designated tenant (for example, when the one or more designated locations are "UK" and "Japan", the "target lower-ranking tenant quota" may be a quota that includes at least one of "UK" and "Japan" and does not include a location other than "UK" and "Japan"). When a result of the capacity determination is false for at least one higher-ranking tenant of the designated tenant (for example, S806: No), the result of the conflict determination may be false. In this way, in the centralized management of the quotas of the storage devices at the plurality of locations 6000, from the viewpoint of the capacity upper limit in addition to the tenant hierarchical relationship and the location, it is possible to avoid the quota conflict (here, setting, for the designated tenant, a quota that is outside a range of a location and a capacity upper limit of the quota of the higher-ranking tenant).

The "condition" in the capacity determination may be that a difference obtained by subtracting the following (Y) from the following (X) is equal to or greater than the following (Z).

(X) The capacity upper limit associated with the target higher-ranking tenant quota of the higher-ranking tenant of the designated tenant.

(Y) A total of the following (y1) to (y3):

(y1) A capacity used by the higher-ranking tenant in a range of the target higher-ranking tenant quota (for example, the capacity represented by the used capacity 4337).

(y2) The designated capacity upper limit of the designated tenant.

(y3) A total of the capacity upper limits of the target lower-ranking tenant quotas of the one or more lower-ranking tenants of the designated tenant.

(Z) A first threshold (0 or more).

An example of determining whether the record satisfies the conditions may be S804 to S806 in FIG. 8 (including S901 to S905 in FIG. 9). That is, as an example, (y2) may be subtracted from (X) (for example, S804), then (y1) is subtracted, and then the capacity upper limits of the one or more target lower-ranking tenant quotas may be subtracted in sequence (for example, S902) to determine whether a finally obtained value is equal to or greater than (Z) (for example, S903). When the result of the capacity determination is false for the at least one higher-ranking tenant of the designated tenant (S806: No), the result of the conflict determination may be false.

The interface device 4100 may communicate with a user terminal. The user terminal may be a physical information processing terminal or an input/output console of a user, or may be a logical information processing terminal (for example, a virtual desktop or an account). The user terminal may be the provider terminal 1000, the consumer terminal 2000, or an administrator terminal (not shown) of an administrator of the storage system. The user may be any of a provider, a consumer, and an administrator. When a resource depletion location is detected, the CPU 4200 may transmit, to the user terminal, information suggesting adding a hardware resource to the resource depletion location in order to increase a capacity of the resource depletion location. The "resource depletion location" may be at least one location associated with the target higher-ranking tenant quota in which a difference obtained by subtracting the above (Y) from the above (X) (for example, a difference compared in S903) is less than a second threshold larger than the first threshold. For example, when the locations associated with such a target higher-ranking tenant quota are "US-West", "UK" and "Japan", the resource depletion locations may be all or a part of those locations, or may be all or a part of the designated locations "UK" and "Japan." Accordingly, in parallel with setting of the requested quota (or rejection to the quota request), it can be expected that a resource (typically a physical storage device on which data stored in the logical volume is stored) are added to the location 6000 in advance to avoid a capacity shortage. Since the information indicating the addition is transmitted, if the result of the conflict determination is true, information related to the requested resource may be added to the quota information without a manual approval.

The CPU 4200 may provide, to the provider terminal 1000 (an example of the user terminal), a quota interface (for example, the quota interface 4400) which is an interface that receives the tenant, the one or more locations, and the capacity upper limit related to the requested quota. The tenant, the one or more locations, and the capacity upper limit related to the requested quota may be designated via the quota interface. Accordingly, the provider can assign the quota to the tenant.

The CPU 4200 may provide, to the consumer terminal 2000 (an example of the user terminal), the quota interface (for example, the quota interface 4400) which is the interface that receives the tenant, the one or more locations, and the capacity upper limit related to the requested quota. Accordingly, the consumer can request the quota. When the result of the conflict determination is false, the CPU 4200 may transmit information representing that there is no conflict for the requested quota to the provider terminal 1000, and may add the information related to the requested quota to the quota table 4330 when the approval for the requested quota is received from the provider terminal 1000. Since the quota is set in response to an approval of an authorized user called the provider, improvement in security is expected. When the result of the conflict determination is false, the CPU 4200 may add the information related to the requested quota to the quota table 4330 without a manual approval of the provider or the like. Accordingly, it is expected to further reduce a work burden on the quota setting.

One or more storage types may be defined for each of the plurality of locations 6000 (for example, the location table 4320). For each quota, the information related to the quota may further include information representing the storage type. The CPU 4200 may receive designation of the storage type in relation to the requested quota. The "target higher-ranking tenant quota" may be a quota that is associated with the same storage type as the designated storage type among the one or more quotas of the higher-ranking tenants of the designated tenant. Accordingly, from the viewpoint of the storage type as well, it is possible to avoid setting, for the designated tenant, a quota that is outside a quota range of the higher-ranking tenant.

The CPU 4200 may receive a capacity request in which the tenant, the location, and the capacity are designated. The CPU 4200 may specify a target quota that is a quota associated with the location designated in the capacity request among one or more quotas specified from the quota table 4330 for the tenant designated in the capacity request. The CPU 4200 may make provision determination (for example, S1006) as to whether the capacity designated in the capacity request can be provided to the tenant designated in the capacity request, based on the target quota. When a result of the provision determination is true, the CPU 4200 may provide the capacity (for example, the logical volume) designated in the capacity request to the tenant designated in the capacity request. In this way, in the centralized management of the quotas of the storage devices at the plurality of locations 6000, the CPU 4200 can receive designation of the tenant and the location, and provide the designated capacity to the tenant within a quota range corresponding to the tenant and the location. The "logical volume" may be a logical storage area provided to the tenant (specifically, for example, the consumer terminal 2000 or a computer that executes an application used by the consumer terminal 2000). The logical volume may be a real logical volume or a virtual logical volume. The real logical volume may be a logical volume based on a physical storage resource (for example, one or more PDEVs) of a storage device that provides the logical volume. The virtual logical volume may be a logical volume that is formed by a plurality of virtual storage areas and follows capacity virtualization technology (typically, thin provisioning). Further, the provision determination may be determination as to whether a difference obtained by subtracting the following (B) from the following (A) is equal to or greater than the following (C).

(A) A capacity upper limit of the target quota.
(B) A total of the following (b1) and (b2):
(b1) A used capacity of the target quota.
(b2) Capacity upper limits respectively associated with the target lower-ranking tenant quotas of one or more lower-ranking tenants of the tenant designated in the capacity request. (Here, the "target lower-ranking tenant quota" may be a quota associated with one or more locations including a location designated in the capacity request among the one or more quotas of the lower-ranking tenants of the tenant designated in the capacity request.)
(C) A capacity designated in the capacity request.

An example of determining whether the record satisfies the conditions may be S1002 to S1006 in FIG. 10. That is, as an example, (b1) may be subtracted from (A) (for example, S1003), then the capacity upper limits of the one or more target lower-ranking tenant quotas may be sequentially subtracted (for example, S1005) to determine whether a finally obtained value is equal to or greater than (C) (for example, S1006).

The conflict determination may include determining (for example, S801) whether, for the tenant designated in the quota request, there is a quota that includes at least one of the one or more locations designated in the quota request in the quota table 4330. When the result of the determination is true (for example, S801: Yes), the result of the conflict determination may be true (for example, S808). In this way, in the centralized management of the quotas of the storage devices at the plurality of locations 6000, it is possible to avoid setting different quotas having overlapping locations for the same tenant.

What is claimed is:

1. A quota management system comprising:
   an interface device configured to communicate with a storage system;
   a storage configured to store tenant information including information representing each of a plurality of tenants of the storage system, and quota information including information related to quotas of the storage system; and
   a processor connected to the interface device and the storage, wherein
   the storage system includes a plurality of storage devices located at a plurality of locations,
   for each quota, the information related to the quota includes information representing a respective tenant, one or more locations among the plurality of locations, and a capacity upper limit,
   for each of the plurality of locations, a capacity usable by the respective tenant among a capacity of the storage device at the location is equal to or less than the capacity upper limit of the quota defined in the quota information, the quota corresponding to the respective tenant and the one or more locations including the location, and
   the processor is configured to:
   receive a quota request in which a designated tenant, one or more locations, and a capacity upper limit related to a requested quota are designated,
   execute conflict determination to determine, based on the tenant information and the quota information, whether there is a conflict with respect to the requested quota, which is the quota associated with the designated tenant, the one or more locations, and the capacity upper limit designated in the quota request, and
   when a result of the conflict determination is false, add, to the quota information, information related to the requested quota associated with the designated tenant, the location, and the capacity upper limit which are designated.

2. The quota management system according to claim 1, wherein
   the tenant information represents a hierarchical relationship of the plurality of tenants,
   the conflict determination includes determining whether there is a target higher-ranking tenant quota for a higher-ranking tenant of the designated tenant,
   the target higher-ranking tenant quota is a quota associated with one or more locations including all of the one or more designated locations among one or more quotas of the higher-ranking tenant of the designated tenant, and
   when there is no target higher-ranking tenant quota for at least one higher-ranking tenant of the designated tenant, the result of the conflict determination is false.

3. The quota management system according to claim 2, wherein
   the conflict determination includes capacity determination of determining whether the designated capacity upper limit satisfies a condition,
   the capacity determination is determination based on a capacity upper limit associated with the target higher-ranking tenant quota of the higher-ranking tenant of the designated tenant, and capacity upper limits respectively associated with target lower-ranking tenant quotas of one or more lower-ranking tenants of the designated tenant,
   the target lower-ranking tenant quota is a quota associated with one or more locations that are all included in the one or more designated locations among one or more quotas of the lower-ranking tenant of the designated tenant, and
   the result of the conflict determination is false when a result of the capacity determination is false for the at least one higher-ranking tenant of the designated tenant.

4. The quota management system according to claim 3, wherein
   the condition is that a difference obtained by subtracting the following (Y) from the following (X) is equal to or greater than the following (Z), in which
   (X) is the capacity upper limit associated with the target higher-ranking tenant quota of the higher-ranking tenant of the designated tenant,
   (Y) is a total of the following (y1) to (y3),
   (y1) being a capacity used by the higher-ranking tenant in a range of the target higher-ranking tenant quota,
   (y2) being the designated capacity upper limit of the designated tenant, and
   (y3) being a total of capacity upper limits of the target lower-ranking tenant quotas of the one or more lower-ranking tenants of the designated tenant, and
   (Z) is a first threshold (0 or more).

5. The quota management system according to claim 4, wherein
   the interface device is configured to communicate with a user terminal, when a resource depletion location is detected, the processor transmits, to the user terminal, information suggesting adding a hardware resource to the resource depletion location in order to increase a capacity of the resource depletion location, and the resource depletion location is at least one location associated with the target higher-ranking tenant quota for which the difference obtained by subtracting the (Y) from the (X) is less than a second threshold larger than the first threshold.

6. The quota management system according to claim 1, wherein
the interface device is configured to communicate with a provider terminal of a provider of the designated tenant,
the processor provides the provider terminal with a quota interface which is an interface configured to receive the designated tenant, the one or more locations, and the capacity upper limit related to the requested quota, and
the designated tenant, the one or more locations, and the capacity upper limit related to the requested quota are designated via the quota interface.

7. The quota management system according to claim 1, wherein
the interface device is configured to communicate with a consumer terminal of a consumer belonging to the designated tenant,
the processor provides the consumer terminal with a quota interface that is an interface configured to receive the designated tenant, the one or more locations, and the capacity upper limit related to the requested quota, and
the designated tenant, the one or more locations, and the capacity upper limit related to the requested quota are designated via the quota interface.

8. The quota management system according to claim 7, wherein
the interface device is configured to further communicate with a provider terminal of a provider of the designated tenant, and
the processor is configured to, when the result of the conflict determination is false,
transmit, to the provider terminal, information representing that there is no conflict for the requested quota, and
add, to the quota information, the information related to the requested quota associated with the designated tenant, the location, and the capacity upper limit which are designated when an approval for the requested quota is received from the provider terminal.

9. The quota management system according to claim 1, wherein
the processor is configured to, when the result of the conflict determination is false, add, to the quota information, the information related to the requested quota without a manual approval.

10. The quota management system according to claim 2, wherein
one or more storage types are defined for each of the plurality of locations,
for each quota, the information related to the quota further includes information representing a storage type,
the processor further receives designation of a storage type related to the requested quota, and
the target higher-ranking tenant quota is the quota that is further associated with the same storage type as the designated storage type among the one or more quotas of the higher-ranking tenant of the designated tenant.

11. The quota management system according to claim 1, wherein the processor is configured to:
receive a capacity request in which a tenant is designated in the capacity request, a location, and a capacity are designated,
specify a target quota that is a quota associated with the location designated in the capacity request among one or more quotas specified from the quota information for the tenant designated in the capacity request,
execute provision determination of determining, based on the target quota, whether provision of the capacity designated in the capacity request to the tenant designated in the capacity request is possible, and
provide the capacity designated in the capacity request to the tenant designated in the capacity request when a result of the provision determination is true.

12. The quota management system according to claim 11, wherein
the tenant information represents a hierarchical relationship of the plurality of tenants, and
the provision determination determines whether a difference obtained by subtracting the following (B) from the following (A) is equal to or greater than the following (C), in which
(A) is a capacity upper limit of the target quota,
(B) is a total of the following (b1) and (b2),
(b1) being a used capacity of the target quota, and
(b2) being capacity upper limits respectively associated with target lower-ranking tenant quotas of one or more lower-ranking tenants of the tenant designated in the capacity request, the target lower-ranking tenant quota being a quota associated with one or more locations including the location designated in the capacity request among one or more quotas of the lower-ranking tenant of the tenant designated in the capacity request, and
(C) is the capacity designated in the capacity request.

13. The quota management system according to claim 1, wherein
each of the plurality of locations is one of a site, a geographical region, a data center, and a network area.

14. The quota management system according to claim 1, wherein
the conflict determination includes determining whether the quota information includes a quota including at least one of the one or more designated locations for the designated tenant, and
when a result of the determination is true, the result of the conflict determination is true.

15. A quota management method comprising:
receiving, by a computer, a quota request in which a designated tenant, one or more locations, and a capacity upper limit related to a requested quota are designated;
executing, by the computer, conflict determination to determine, based on tenant information and quota information, whether there is a conflict with respect to the requested quota, which is the quota associated with the designated tenant, the one or more locations, and the capacity upper limit designated in the quota request; and
when a result of the conflict determination is false, adding, by the computer to the quota information, information related to the requested quota associated with the designated tenant, the location, and the capacity upper limit which are designated, wherein the tenant information includes information representing each of a plurality of tenants of a storage system, the storage system includes a plurality of storage devices located at a plurality of locations, the quota information includes information related to quotas of the storage system, for each quota, the information related to the quota includes information representing a respective tenant, one or more locations among the plurality of locations, and a capacity upper limit, and for each of the plurality of locations, a capacity usable by the respective tenant among a capacity of the storage device at the location is equal to or less than the capacity upper limit of the quota defined in the quota information, the quota corresponding to the respective tenant and the one or more locations including the location.

\* \* \* \* \*